(12) United States Patent
Carboneri et al.

(10) Patent No.: US 7,621,721 B2
(45) Date of Patent: Nov. 24, 2009

(54) VACUUM PUMPING DEVICE WITH ELECTRONIC CONTROL OF THE MOTOR

(75) Inventors: Roberto Carboneri, Settimo Torinese (IT); Mario Busso, Turin (IT)

(73) Assignee: Varian, S.p.A., Leini, Turin (IT)

( * ) Notice: Subject to any disclaimer, the term of this patent is extended or adjusted under 35 U.S.C. 154(b) by 565 days.

(21) Appl. No.: 10/846,248

(22) Filed: May 14, 2004

(65) Prior Publication Data

US 2004/0265135 A1 Dec. 30, 2004

(30) Foreign Application Priority Data

May 28, 2003 (IT) .......................... TO2003A0392

(51) Int. Cl.
F04B 49/06 (2006.01)
(52) U.S. Cl. .......................... 417/45; 417/32; 417/44.1; 417/44.11; 417/220
(58) Field of Classification Search .................. 417/220, 417/53, 44.1, 44.2, 44.11, 45, 32
See application file for complete search history.

(56) References Cited

U.S. PATENT DOCUMENTS

| 4,664,601 | A | 5/1987 | Matsubara et al. | |
| 5,110,264 | A | 5/1992 | Murry | |
| 5,181,414 | A * | 1/1993 | Baret et al. | 73/40.7 |
| 6,182,634 | B1 * | 2/2001 | Caldwell et al. | 123/339.16 |
| 6,234,759 | B1 * | 5/2001 | Hennel et al. | 417/44.1 |
| 6,265,786 | B1 * | 7/2001 | Bosley et al. | 290/52 |
| 6,350,105 | B1 * | 2/2002 | Kobayashi et al. | 417/44.1 |
| 6,551,068 | B2 * | 4/2003 | Blotenberg | 417/53 |
| 7,029,239 | B2 * | 4/2006 | Marando et al. | 417/32 |
| 2002/0018721 | A1 * | 2/2002 | Kobayashi et al. | 417/44.1 |
| 2002/0136642 | A1 * | 9/2002 | Moller | 417/44.11 |

FOREIGN PATENT DOCUMENTS

| DE | 196 30 384 | * | 4/1998 |
| DE | 196 30 384 A | | 4/1998 |
| DE | 197 05 672 A | | 4/1998 |

* cited by examiner

Primary Examiner—Devon C Kramer
Assistant Examiner—Leonard J Weinstein
(74) Attorney, Agent, or Firm—Bella Fishman

(57) ABSTRACT

An oil mechanical vacuum pump, which is equipped with an electric motor comprises an electronic control device for supplying the electric motor with power. The electronic control device comprises a frequency converter for controlling the excitation frequency $F_{ecc}$ of the voltage signal $S_U$ by which the motor is powered as a function of at least one operating parameter of the pump and of at least one threshold value that can be modified depending on the operating conditions of the pump.

14 Claims, 5 Drawing Sheets

VACUUM PUMPING DEVICE WITH ELECTRONIC CONTROL OF THE MOTOR

FIELD OF THE INVENTION

The present invention relates to a vacuum pumping device.

More particularly, the vacuum pumping device comprises an oil mechanical vacuum pump, equipped with an electric motor, and an electronic control device supplying the motor of the pump with power.

BACKGROUND OF THE INVENTION

Oil rotary mechanical pumps are generally employed to produce low vacuum conditions in a pressure range from atmospheric pressure to about $10^{-1}$ Pa.

Conventional mechanical pumps comprise a housing having a suction and a discharge port. A stator is located inside the housing and defines a cylindrical chamber where an eccentrically arranged circular rotor equipped with spring-loaded radial vanes. The pumps are immersed in an oil bath to refrigerate and lubricate the pumps and to isolate them from the external environment.

These pumps require a high torque for cold acceleration, because of the low oil temperature. They can give rise to a strain of the electronic control units supplying the motor with power and of the motor itself.

Vacuum pumping devices are also known comprising electronic control devices capable of supplying a variable frequency output signal for driving the pump motor.

These systems are particularly common in high vacuum field and they act on the excitation frequency of the voltage signal by which the electric motor rotating the vacuum pump is powered, causing a variation in the rotation speed of the motor and consequently in the pumping speed of the pump.

Generally, in high vacuum pumping devices, it is advantageous to vary the excitation frequency, in the vacuum pump starting phase, in particular during the acceleration ramp, to limit the acceleration torque.

In the starting phase, the vacuum pump generally sucks air at atmospheric pressure at a much higher pressure than the suction pressure in steady state conditions. Consequently, the acceleration torque is very high and compels to use an electric motor with higher performance than that required by the steady state conditions of the pump.

Using control devices with a variable frequency output signal allows starting the pump at a lower speed, thereby reducing the acceleration torque, and consequently allows using electric motors with performance suitable for steady state conditions of the vacuum pump, such motors are less expensive and cumbersome.

Electronic control devices of that kind are disclosed in documents U.S. Pat. No. 4,664,601 and U.S. Pat. No. 5,110,264.

Thus, it is an object of the present invention to provide a mechanical pumping device for high pressures, which is inexpensive and has a reduced size, while meeting however the aforementioned requirements of high reliability and useful life duration.

It is another object of the invention to provide a mechanical pumping device capable of attaining higher vacuum degrees than conventional systems, while maintaining reduced sizes and costs.

The above and other objects are achieved by a vacuum pumping device according to the invention, as claimed in the appended claims.

SUMMARY OF THE INVENTION

In the vacuum pumping device according to the invention, the electronic control device comprises a frequency converter, controlled by a microprocessor and capable of driving the pump motor with a variable frequency signal.

Advantageously, said electronic control device converts the single-phase, fixed frequency AC signal from the mains into a three-phase AC signal, with a frequency independent of the mains frequency. Consequently, pumping speeds different from that imposed by the mains frequency can be obtained. More particularly, when introduced into the pumping device of the invention, an oil mechanical pump can attain higher speeds than those attainable by a pump with the same characteristics. In other words, by using the pumping device according to the invention, high pumping speeds can be achieved by a pump of small size and reduced cost.

Advantageously moreover, according to the invention, the same performance can be achieved for a same oil mechanical pump whatever the frequency of the mains to which said pump is connected (50 Hz or 60 Hz).

When starting said oil mechanical pump, the electric motor can be started and accelerated according to a frequency ramp beginning at a very low value and gradually increasing so as to maintain the acceleration torque and the power drain below a predetermined threshold.

A non-limiting exemplary embodiment of the pumping device according to the invention will be described more in detail hereinafter, with reference to the accompanying figures.

DETAILED DESCRIPTION OF THE INVENTION

Figure 1:
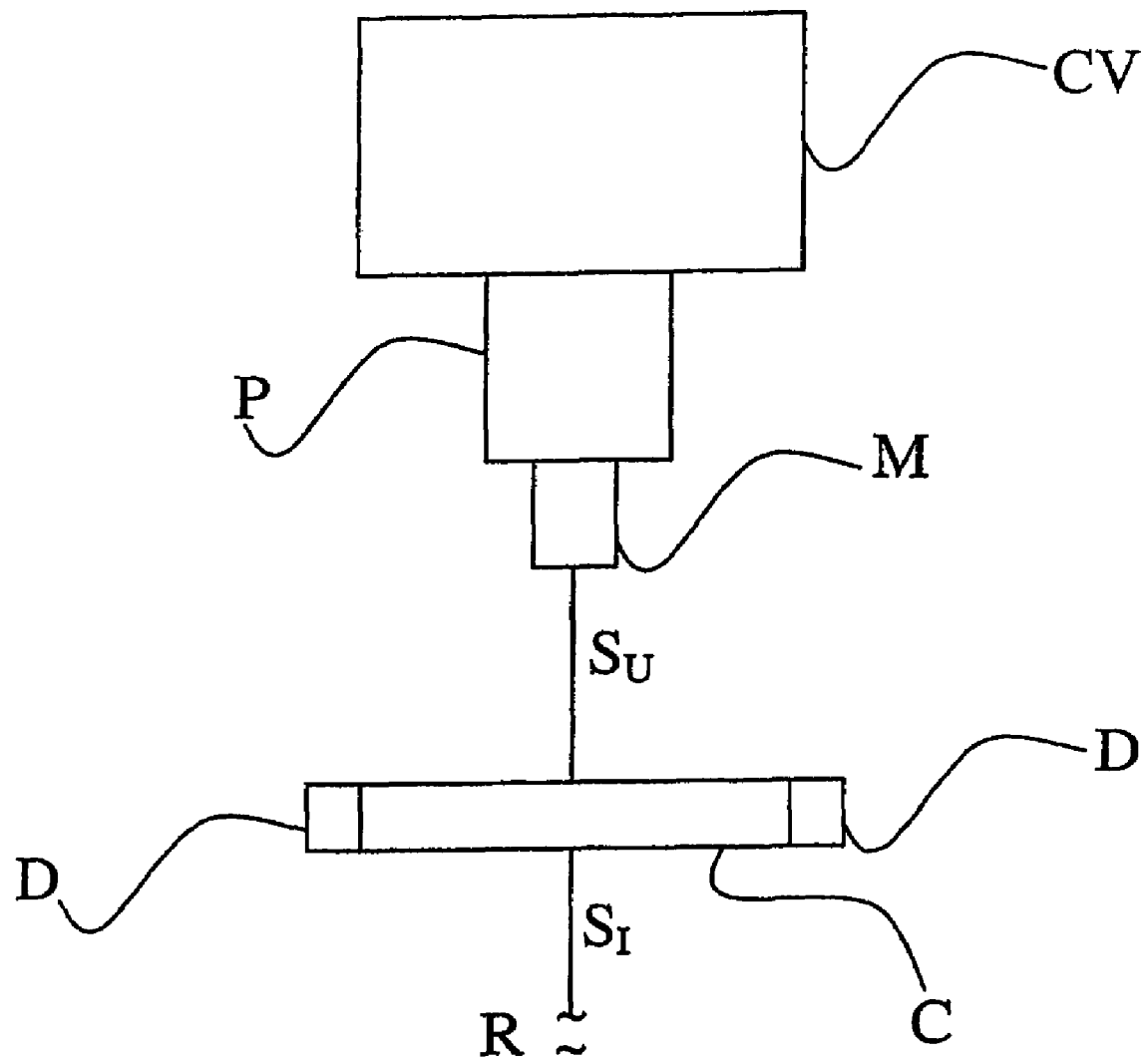
FIG. 1 is a block diagram of the vacuum pumping device according to the present invention.

Referring to FIG. 1, the vacuum pumping device according to the invention essentially comprises an oil mechanical vacuum pump P, equipped with an electric motor M, and an electronic control device C.

Control device C is powered through mains R and it provides the power supply for motor M by means of a voltage signal Su. The suction port of vacuum pump P communicates with a vacuum chamber CV where vacuum conditions are to be created.

Figure 2:
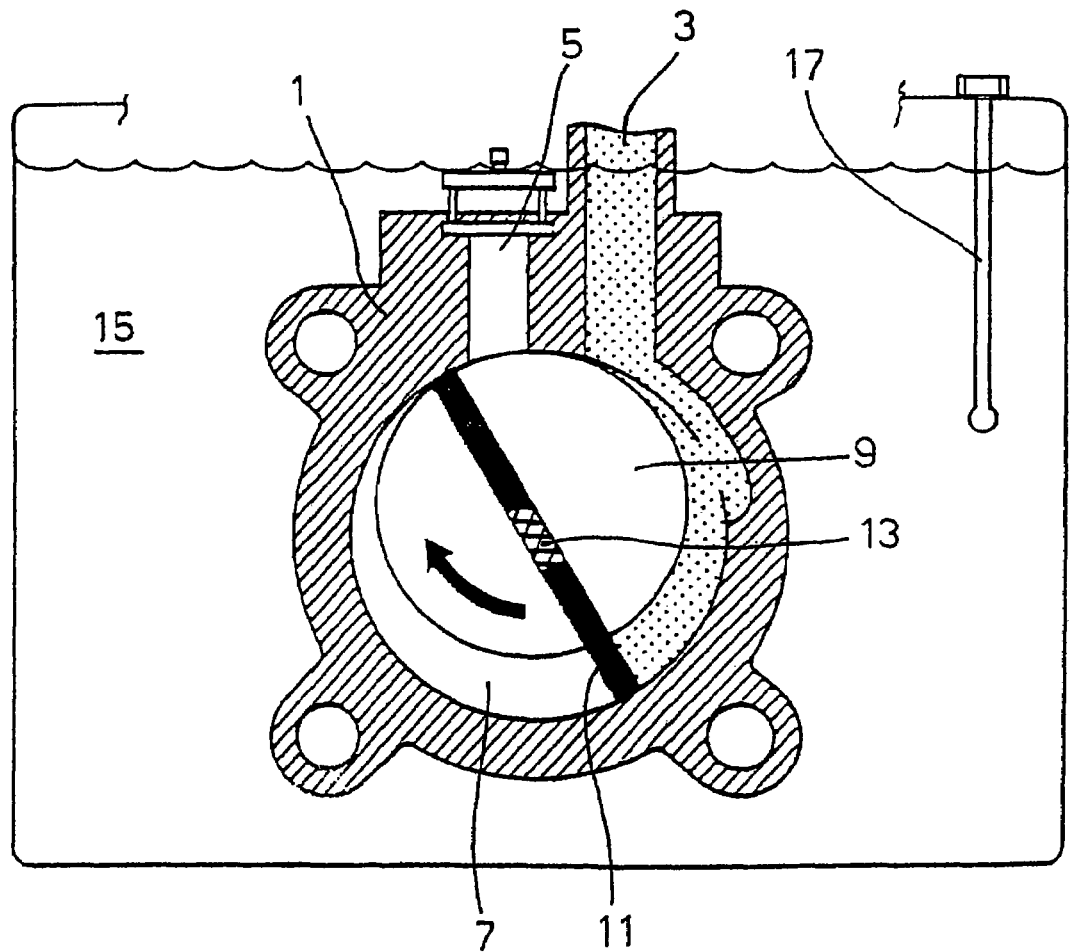
FIG. 2 is a diagrammatic cross-sectional view of an oil mechanical pump.

As shown in FIG. 2, this pump P is an oil mechanical pump and comprises a housing 1, where a cylindrical chamber 7, preferably of circular cross section, is formed. The chamber houses a cylindrical rotor 9, with axis parallel to that of the cylindrical chamber 7, but eccentrically located relative to it. One or more radially displaceable radial vanes 11 (two in the example shown) are mounted on the rotor 9 and are kept against the walls of the chamber 7 by springs 13.

Gas sucked through suction port 3 enters chamber 7, where it is pushed, and therefore compressed, by vanes 11, and then gas is exhausted through a discharge port 5. Housing 1 is immersed in an oil bath 15, which acts as cooling fluid and lubricant. In known manner, the pump is constructed so that an amount of oil can penetrate inside the chamber 7 to form a thin film ensuring tightness between vanes 11 of rotor 9 and the walls of the chamber 7.

A temperature detector 17, immersed in oil bath 15, is further provided in order to supply control device C with an electric signal representative of the temperature and to allow controlling the driving frequency of the pump motor, as it will become apparent from the following description.

Referring to FIG. 1, the control device C comprises a frequency converter, capable of converting input signal $S_1$ from the mains, which signal generally is a single-phase AC signal at fixed frequency (50 Hz in Europe, 60 Hz in the United States of America), into a variable frequency, three-phase AC output signal Su, by which motor M is powered.

Figure 3:
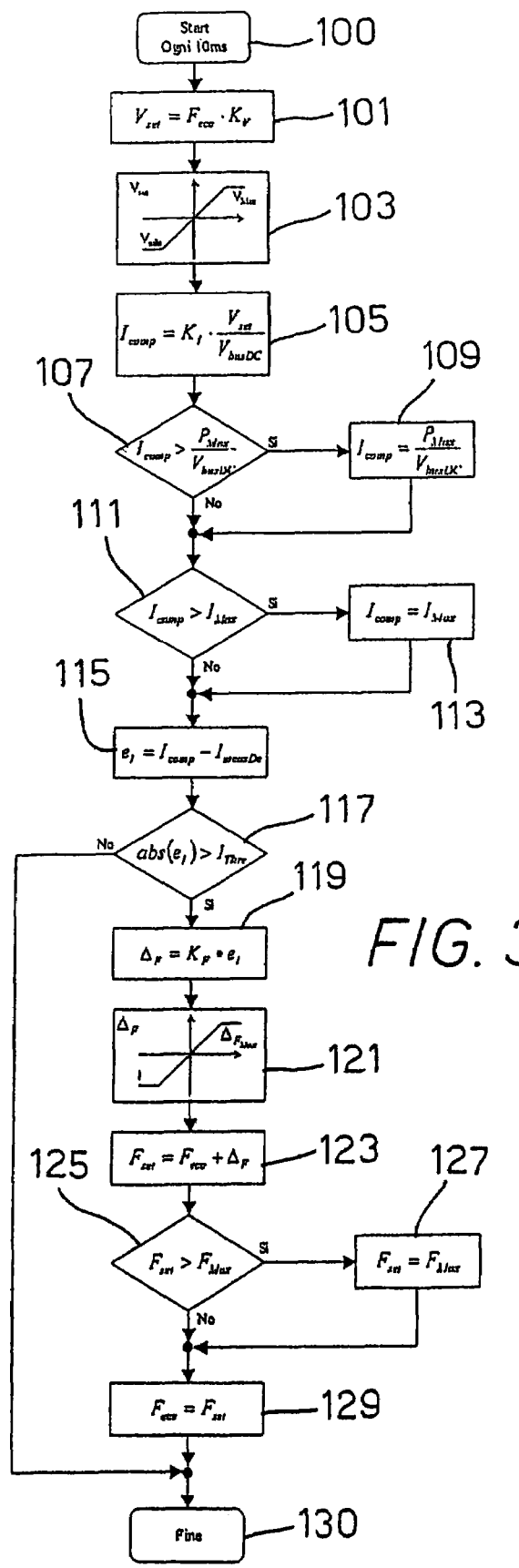
FIG. 3 is a flow chart schematically depicting the operation of the electronic control device.

Referring to FIG. 3, the algorithm for controlling the signal by which the vacuum pump motor is powered will be disclosed in detail.

According to the invention, equivalent voltage $V_{set}$ and excitation frequency $F_{ecc}$ of signal $S_U$ supplying motor M of pump P with power are adjusted according to a control algorithm providing for varying equivalent voltage $V_{set}$ and excitation frequency $F_{ecc}$ depending on measured current drain $I_{measDC}$ of the pump and on the maximum power $P_{MAX}$ that can be delivered.

Adjustment of equivalent voltage $V_{set}$ and excitation frequency $F_{ecc}$ takes place at predetermined time intervals, for instance every 10 ms (step 100).

At step 101, the equivalent voltage is obtained as:

$$V_{set} = F_{ecc} \cdot K_v$$

where $K_v$ is a constant depending on the characteristics of the pumping device and expressed in Volt/Hertz. For an exemplary pumping device equipped with a 135 V motor, that constant can have a value of 5 V/Hz.

At step 103, equivalent voltage $V_{set}$ previously computed is compared with predetermined minimum and maximum constant values $V_{min}$, $V_{max}$, respectively, also depending on the pumping device characteristics. The value of $V_{set}$ is equalled to $V_{min}$ if $V_{set} < V_{min}$ and to $V_{max}$ if $V_{set} > V_{max}$, so as to saturate (clip) $V_{set}$ outside said predetermined values.

At step 105 reference current $I_{comp}$ is determined, which is a function of the slicing given by the ratio between equivalent voltage $V_{set}$ and direct bus voltage $V_{busDC}$ (135 V in the mentioned exemplary embodiment), according to relation:

$$I_{comp} = K_1 \cdot Vset / V_{busDC}$$

where $K_1$ is a constant, expressed in Ampere, depending on the pumping device. For a pumping device with a 135 V motor, that constant is equalled to 5.3 A.

At steps 107 to 113, the maximum value of reference current $I_{comp}$ is clipped according to relations:

$$I_{comp} = P_{MAX} / V_{busDC}$$

$$I_{comp} = I_{MAX}$$

where $P_{MAX}$ is the maximum power that can be delivered by the control device in that operating phase and $I_{MAX}$ is the maximum current that can be delivered.

Clipping of the minimum value of $I_{comp}$ is not necessary, since $I_{comp}$ is limited downwards by the minimum value $V_{set}$ can take.

At step 115, the reference variable is computed:

$$e_I = I_{comp} - I_{measDc}$$

where $I_{measDc}$ is the current measured across the amperometric resistor upstream the three-phase bridge by which the electric pump motor is powered.

Then, at steps 117 to 129, the operation cycle for varying excitation frequency $F_{ecc}$ is performed.

More particularly, at step 117, the absolute value of $e_I$ is compared to threshold value $I_{Thre}$ defining the current range about $I_{comp}$ inside which no variation of excitation frequency $F_{cc}$ is performed.

As long as measured current $I_{meas}$ remains inside the predetermined range $I_{Thre}$ about $I_{comp}$, excitation frequency $F_{ecc}$ is not changed and the cycle ends at step 130.

At steps 119, 121 the amplitude of the variation step for excitation frequency $F_{ecc}$ is computed according to relation:

$$\Delta F = K_F \cdot e_I$$

where $K_F$ is a proportionality factor for varying the frequency depending on the delivered current.

It will be appreciated that $\Delta F$ can be either positive or negative, that is it may correspond to either an increase or a decrease of the excitation frequency, depending on the operating conditions of the pumping device.

At step 121 $\Delta_F$ is clipped both up and down with respect to values $\Delta_{FMAX}$ and $\Delta_{FMIN}$, respectively, where said threshold values depend on the characteristics of the pumping device.

At step 123, excitation frequency $F_{ecc}$ is varied by $\Delta_F$ according to relation:

$$F_{set} = F_{ecc} + \Delta_F$$

At steps 125, 127, the maximum value of the new frequency computed in this way is limited according to relation:

$$F_{set} = F_{MAX}$$

where $F_{MAX}$ is the maximum excitation frequency in steady state conditions.

At step 129, the new excitation frequency is set according to relation:

$$F_{ecc} = F_{set}$$

and the cycle ends at step 130.

Modification of excitation frequency $F_{ecc}$ continues as long as measured current $I_{meas}$ remains outside the range, with width $I_{Thre}$, about $I_{comp}$, i.e. until the attainment of the steady state conditions.

Advantageously, value $P_{MAX}$ of the maximum power that can be delivered by the control device could be varied depending on the operating conditions of the pumping device.

More particularly, $P_{MAX}$ could be varied as a function of the following parameters:

during the normal steady state operation of the pump, $P_{MAX}$ takes value $P_{reg}$ corresponding to the maximum power that can be delivered for the particular pumping device (control device/pump motor);

during transients in which steady state operation is altered, for instance due to a temporary gas load or during hot starts, $P_{MAX}$ takes one or more predetermined boost values $P_{boost} > P_{reg}$ for a limited time;

during the most demanding phases, for instance in case of a cold start, $P_{MAX}$ takes boost value(s) $P_{start1}$, $P_{start2} > P_{reg}$ for a limited time, depending on pump oil temperature $T_1$ and so that a threshold value T2 of the temperature of dissipators D of the electronic power devices is not exceeded;

if a decrease in the pump rotation speed is desired, for instance for load requirements, $P_{MAX}$ may take a predetermined brake value $P_{brake} < P_{reg}$.

The modification of limit $P_{MAX}$ results in a modification of the variation range of reference current $I_{comp}$ and, consequently, in a modification of the variation range of excitation frequency $F_{ecc}$.

Advantageously, excitation frequency $F_{ecc}$ is autonomously determined by the electronic control device, as a function of the above mentioned parameters, and it is independent of the mains frequency. Thus, it is possible to vary the pumping speed of pump P, adapting it to the changed operating conditions of the pump, this speed is proportional to the rotation speed of motor M and the latter is proportional to the excitation frequency of the power supply signal for the motor.

As a first consequence, for a same oil mechanical pump P, the same performance can be obtained whatever the frequency of mains R, that is for instance, both when the pump is used in Europe and when it is used in the United States of America.

Moreover, in transient conditions, due to a sudden gas load, it is possible to vary the excitation frequency of the power supply signal for motor M so as to keep the speed of pump P constant by acting on value of $P_{MAX}$.

According to a preferred embodiment of the pumping device of the invention, the user can input from the outside, by means of a suitable software program, a set value of excitation frequency $F_{ecc}$, determined by the operating requirements of the pumping device.

According to that embodiment, the user can supply control device C with a voltage signal, ranging for instance from 0 to 10 V, which will be exploited by said control device C to set a value of the excitation frequency according to a predetermined relation.

Thus, in steady state conditions, pump P can be actuated at lower or higher speed than the nominal speed, depending on the requirements.

In any case, according to the invention, advantageously the power drain of pump P is always kept below a predetermined threshold value to avoid overloads.

As stated before, the main difficulties in driving an oil mechanical pump are related mainly to the transient at the cold start, rather than to transients in steady state conditions. At the cold start, the acceleration torque required of motor M and the power drain of pump P may be very high, also because of the oil viscosity that is strongly dependent on the temperature and is very high at low temperature.

In the pumping device according to the invention, at the cold start, that is, when temperature detector 17 signals a temperature lower than a predetermined threshold to control device C, control device C imposes an acceleration ramp to the motor, thereby bringing the value of $P_{MAX}$ to boost values and hence causing an increase in the excitation frequency, starting from a very low frequency and progressively increasing it as the speed of pump P increases.

Figure 4:
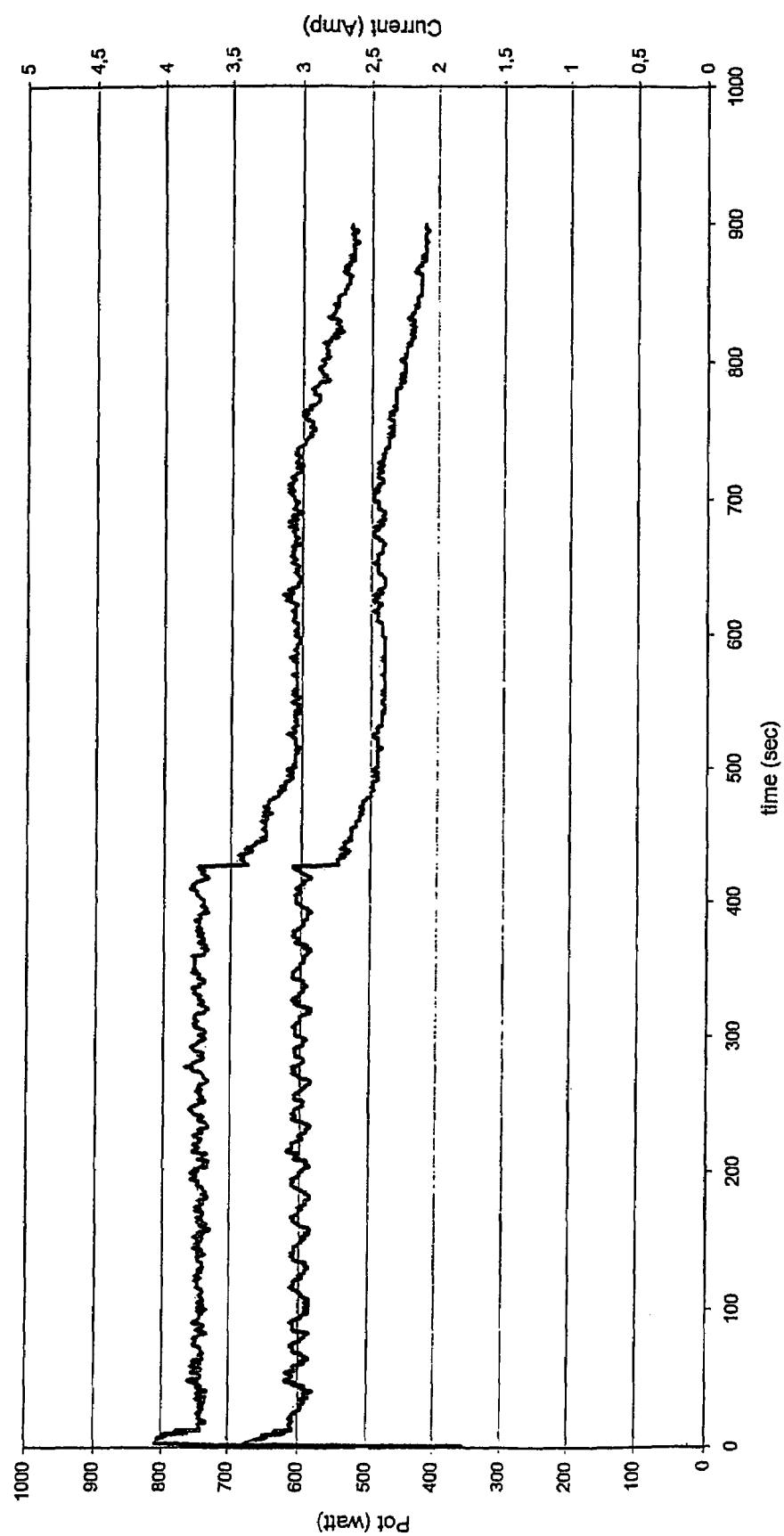
FIG. 4 is a graph of the power drain (upper curve) and the current drain (lower curve) of the pump motor in case of cold start.
Figure 5:
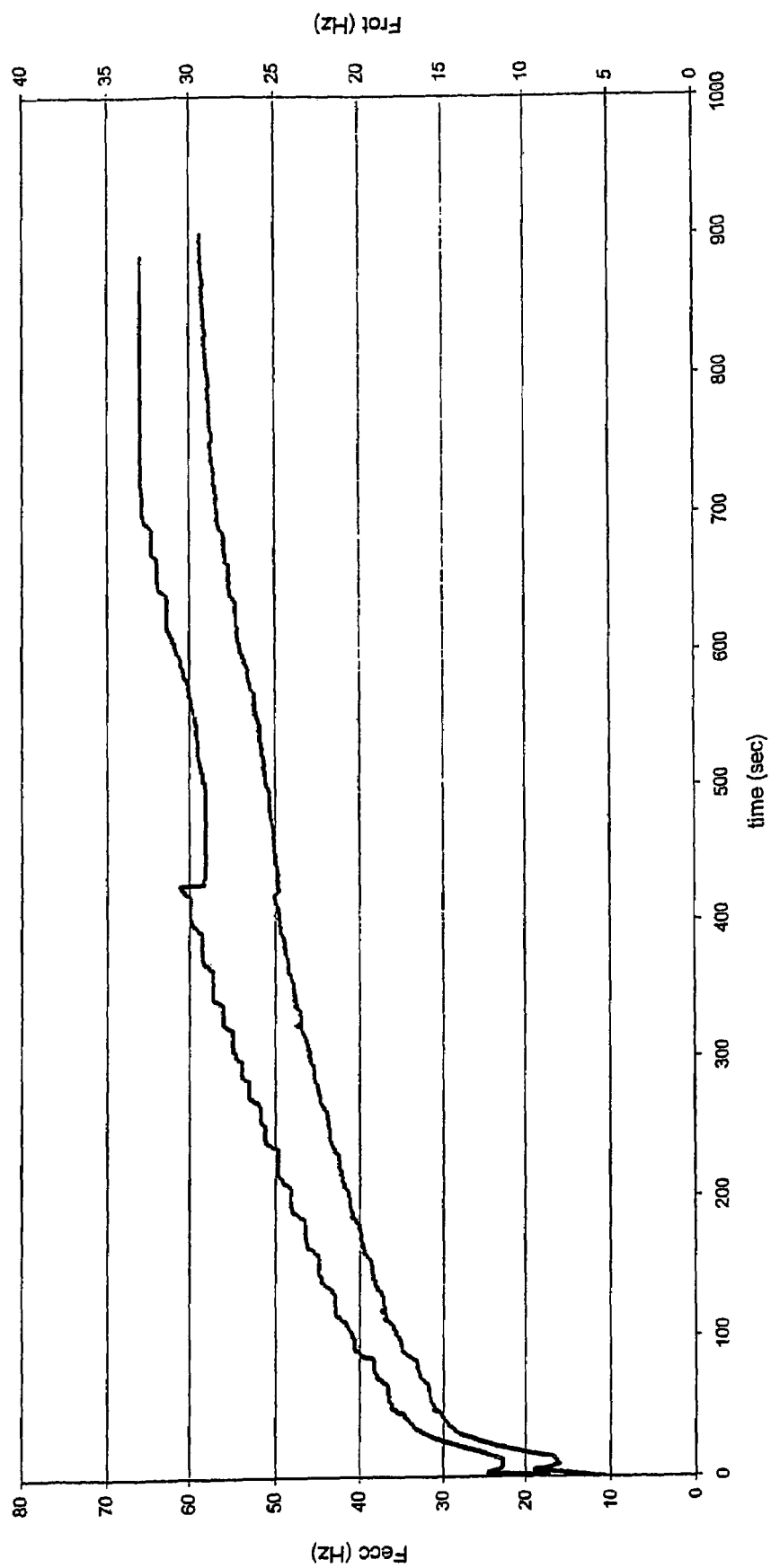
FIG. 5 is a graph of the excitation frequency (upper curve) and the rotation frequency (lower curve) of the motor in case of cold start.

The curves plotting the variations of the power and current drain of pump P and of the excitation frequency in case of cold start (oil temperature $T_1$ of the pump oil equal to 14° C.) are shown, by way of example, in FIGS. 4 and 5.

Referring to FIG. 4, in case of cold start the value of $P_{MAX}$ is set to a first boost value $P_{start}>P_{reg}$, exceeding $P_{reg}$ by 20-30% and being 780 Watt in the example disclosed.

The first boost value is kept for a limited time, equal to about 400 sec in the example shown.

During such time interval, the excitation frequency and consequently the actual rotation frequency gradually increase starting from a very low value, as shown in FIG. 5.

When this time interval is over, the control device checks whether steady state conditions have been attained, that is whether the excitation frequency corresponds with the steady state frequency of the system. In the affirmative, $P_{MAX}$ is set to $P_{reg}$. In the negative, $P_{MAX}$ is set to a value $P_{start2}$, with $P_{reg}<P_{start2}<P_{start1}$ (in the example disclosed, $P_{start2}=650$ W) for a limited time, equal to about 300 sec in the example disclosed. When such time is over, the value of $P_{MAX}$ is brought again to steady state value $P_{reg}$ to avoid overloads.

As shown in FIG. 5, during a second time interval, the excitation frequency, and consequently the actual rotation frequency, continue increasing until they attain a steady state value after about 700 sec from the pump start.

It is to be appreciated that the pumping device according to the invention may also comprise a feedback circuit using the pressure of the residual gas present in vacuum chamber CV connected to pump P as a parameter for controlling excitation frequency $F_{ecc}$. In this manner, the driving frequency of motor M and the pumping speed of pump P can be modified depending on the operating pressure conditions.

The above description has been given only by way of non limiting example and that changes and modifications are possible without departing from the scope of the invention.

What is claimed is:

1. A vacuum pumping device for evacuating a chamber (CV), said vacuum pumping device experiencing in use a plurality of different identifiable operating phases, comprising:
   an oil mechanical pump (P) comprising:
   a housing (1) with a suction port (3) and a discharge port (5), the housing having a cylindrical chamber (7) and a rotor (9) disposed eccentric with respect to said chamber (7) said rotor having radial vanes (11), loaded by springs (13), said housing being equipped with an electric motor (M) for rotating said rotor (9);
   an oil bath (15), with said oil mechanical pump being immersed therein; and
   an electronic control device (C) for supplying said electric motor (M) with power by a voltage signal $S_U$, said electronic control device (C) comprising:
   a frequency converter, which controls an excitation frequency $F_{ecc}$ of the voltage signal $S_U$ powering said motor as a function of the value of at least a measured current drain $I_{meas}$ of said (M), the variation range of said excitation frequency Fecc being in any case limited in accordance with the upper limiting value for the maximum power $P_{MAX}$ that can be delivered by said electronic control device (C) a different value of said upper limiting value being set for each of said plurality of different identifiable operating phases, and an oil temperature detector (17) sending to said electronic control device (C) a signal representative of the temperature of said oil bath in the vacuum pump, said plurality of different operating phases being identified in accordance with said signal representative of the temperature of said oil bath, wherein said upper limiting value takes a value $P_{reg}$ during a steady state operation of the pump, and a value $P_{start1}$ during a cold start phase of the pump, wherein $P_{reg}<P_{start1}$, said upper limiting value takes said value $P_{start1}$ when the temperature of said oil bath is lower than a predetermined limiting value for the temperature of said oil bath.

2. The pumping device as claimed in claim 1, wherein said upper limiting value for the maximum power $P_{MAX}$ that can be delivered by said electronic control device (C) takes said value $P_{start1}$ during the cold start phase of the pump for a predetermined time interval.

3. The pumping device as claimed in claim 2, wherein said predetermined time interval has duration of about 400 sec.

4. The pumping device as claimed in claim 1, wherein said frequency controlling means comprise a frequency converter, to increase the excitation frequency $F_{ecc}$ of the voltage signal $S_U$ by which the motor is powered as long as the measured current drain $I_{meas}$ of the motor is below a predetermined threshold limiting current $I_{comp}$.

5. The pumping device as claimed in claim 4, wherein said upper limiting current $I_{comp}$ is given by:

$$I_{comp}=K_1 \cdot V\text{set}/V_{busDC}$$

where:
$K_1$ is a constant depending on the system,
$V_{set}$ is the equivalent voltage, and
$V_{busDC}$ is the peak voltage supplied to the motor (M).

6. The pumping device as claimed in claim 5, wherein $$I_{MAX}=P_{MAX}/V_{busDC} \text{ and}$$

$$I_{comp}<I_{MAX}.$$

7. The pumping device as claimed in claim 6, wherein $V_{busDC}=187$ V.

8. A vacuum pumping device for evacuating a chamber (CV), said vacuum pumping device experiencing in use a plurality of different identifiable operating phases, comprising:
   an oil mechanical pump (P) comprising:
   a housing (1) with a suction port (3) and a discharge port (5), the housing having a cylindrical chamber (7) and a rotor (9) disposed eccentric with respect to said chamber (7) said rotor having radial vanes (11), loaded by springs (13), said housing being equipped with an electric motor (M) for rotating said rotor (9);
   an oil bath (15) with the oil mechanical pump being immersed therein; and
   an electronic control device (C) for supplying said electric motor (M) with power by a voltage signal $S_U$, said electronic control device (C) comprising:
      a frequency controlling an excitation frequency $F_{ecc}$ of the powering said motor voltage signal $S_U$ as a function of the value of at least a measured current drain $I_{meas}$ of said motor (M),
         the variation range of said excitation frequency Fecc being in any case limited in accordance with an upper limiting value for the maximum power $P_{MAX}$ that can be delivered by said electronic control device (C);
         a different value of said upper limiting value being set for each of said plurality of different identifiable operating phases; and
   an oil temperature detector (17) supplies to said electronic control device (C) a signal representative of the temperature of said oil bath in the vacuum pump, said different operating phases are identified in accordance with the signal representative of the temperature of said oil bath;
   wherein said upper limiting value takes a value $P_{reg}$ during a steady state operation of the pump, and a succession of values $P_{start1}$ and $P_{start2}$ during a cold start phase of the pump, with $P_{reg}<P_{start2}<P_{start1}$, said upper limiting value takes the succession of values $P_{start1}$ and $P_{start2}$ when said temperature of said oil bath is lower than a predetermined limiting value for the temperature of the oil bath.

9. The pumping device as claimed in claim 8, wherein said upper limiting value for the maximum power $P_{MAX}$ that can be delivered by said electronic control device (C) takes said succession of values $P_{start1}$ and $P_{start2}$ during the cold start phase of the pump, during a succession of predetermined time intervals.

10. The pumping device as claimed in claim 9, wherein said succession of predetermined time intervals has duration of about 400 sec during which the upper limiting value $P_{start1}$ for the maximum power $P_{MAX}$ that can be delivered by said electronic control device (C) is applied and of about 300 sec during which the upper limiting value $P_{start2}$ for the maximum power $P_{MAX}$ that can be delivered by said electronic control device (C) is applied.

11. The pumping device as claimed in claim 8, wherein said frequency controlling means comprise a frequency converter, to increase the excitation frequency $F_{ecc}$ of the voltage signal $S_U$ by which the motor is powered as long as the measured current drain $I_{meas}$ of the motor is below a predetermined threshold limiting current $I_{comp}$.

12. The pumping device as claimed in claim 11, wherein said upper limiting current $I_{comp}$ is given by:

$$I_{comp}=K_1 \cdot V\text{set}/V_{busDC}$$

where:
$K_1$ is a constant depending on the system,
$V_{set}$ is the equivalent voltage, and
$V_{busDC}$ is the peak voltage supplied to the motor (M).

13. The pumping device as claimed in claim 12, wherein $$I_{MAX}=P_{MAX}/V_{busDC} \text{ and}$$

$$I_{comp}<I_{MAX}.$$

14. The pumping device as claimed in claim 13, wherein $V_{busDC}=187$ V.

* * * * *